(12) United States Patent
Schlicht

(10) Patent No.: US 6,511,086 B2
(45) Date of Patent: Jan. 28, 2003

(54) FOLDING STEP FOR TRAILER HITCH

(76) Inventor: William S. Schlicht, 1812 230th Court NE, Redmond, WA (US) 98074-6595

( * ) Notice: Subject to any disclaimer, the term of this patent is extended or adjusted under 35 U.S.C. 154(b) by 0 days.

(21) Appl. No.: 09/771,458

(22) Filed: Jan. 26, 2001

(65) Prior Publication Data

US 2001/0045720 A1 Nov. 29, 2001

Related U.S. Application Data

(60) Provisional application No. 60/178,495, filed on Jan. 27, 2000.

(51) Int. Cl.$^7$ .................................................. B60R 3/00
(52) U.S. Cl. .................... 280/166; 280/163; 280/164.1; 280/482
(58) Field of Search ................................. 280/163, 166, 280/164.1, 164.2, 169, 760, 763.1, 765.1, 482; 182/88, 91, 127

(56) References Cited

U.S. PATENT DOCUMENTS

| | | | | | |
|---|---|---|---|---|---|
| 1,953,298 A | * | 4/1934 | Goodwin | ..................... | 105/1.3 |
| 2,158,949 A | * | 5/1939 | Sarles et al. | .................. | 182/91 |
| 3,627,350 A | * | 12/1971 | Cross | ........................... | 182/91 |
| 3,980,319 A | | 9/1976 | Kirkpatrick | ................ | 280/166 |
| 4,194,754 A | | 3/1980 | Hightower | ................... | 280/166 |
| 4,274,648 A | | 6/1981 | Robins | ........................ | 280/166 |
| 4,462,486 A | * | 7/1984 | Dignan | ......................... | 182/91 |
| 4,557,494 A | * | 12/1985 | Elwell | ........................... | 24/514 |
| 4,744,590 A | | 5/1988 | Chesney | ..................... | 224/520 |
| 4,800,471 A | | 1/1989 | Lippert | ...................... | 362/485 |
| 4,906,015 A | * | 3/1990 | LaCroix et al. | ............. | 224/519 |
| 4,953,065 A | * | 8/1990 | Kao | ............................ | 362/307 |
| D316,394 S | | 4/1991 | Carr | ........................... | D12/203 |
| 5,038,983 A | * | 8/1991 | Tomososki | ................... | 224/521 |
| D324,019 S | | 2/1992 | Bailey | ........................ | D12/203 |
| RE34,275 E | * | 6/1993 | Ramsey | ........................ | 362/81 |
| 5,478,124 A | * | 12/1995 | Warrington et al. | ...... | 280/416.1 |
| D370,452 S | * | 6/1996 | Beasley | ....................... | D12/203 |
| 5,690,260 A | * | 11/1997 | Aikins et al. | ............... | 224/504 |
| 5,738,362 A | * | 4/1998 | Ludwick | ..................... | 280/166 |
| 5,803,475 A | * | 9/1998 | Dick | ........................... | 280/163 |
| D409,557 S | * | 5/1999 | Armour | ....................... | D12/408 |
| 5,979,094 A | | 11/1999 | Brafford, Jr. et al. | ......... | 40/590 |
| 6,095,387 A | * | 8/2000 | Lipscomb | ................... | 224/485 |
| 6,170,842 B1 | * | 1/2001 | Mueller | ...................... | 280/163 |

FOREIGN PATENT DOCUMENTS

| | | | | |
|---|---|---|---|---|
| DK | 003327108 A1 | * | 2/1985 | ................. 280/186 |
| JP | 406087380 A | * | 3/1994 | ................. 280/163 |

OTHER PUBLICATIONS

CARR Pamphlet, Steps and Accessories for Trucks, SUV's & Jeep Vehicles(2 pp) www.carr.com; 1–888–696–2277.
CARR Instruction sheet for Hitch Step (1 p).
CARR, 5302 Tweedy Blvd, South Gate, CA 90280.

* cited by examiner

Primary Examiner—Brian L. Johnson
Assistant Examiner—Kelly E Campbell

(57) ABSTRACT

A foldable step assembly that is adjustably engageable with a trailer hitch receiver to achieve a variable horizontal clearance between a step plate and a rearward end of the receiver. The step plate is pivotally mounted to a step mount shank and is foldable from a horizontal use position to a vertical storage position. The step plate has a latch receiving recess, and there is a latch mechanism mounted on an upper part of the of a facing plate on the step mount shank. A brake light is mounted on the step plate to be visible when the step plate is in the vertical storage position.

2 Claims, 5 Drawing Sheets

FOLDING STEP FOR TRAILER HITCH

This application claims the benefit of Provisional Application No. 60/178,495, filed Jan. 27, 2000.

TECHNICAL FIELD

This invention relates to a step for a vehicle, and more particularly, to a removable and foldable step attached to a trailer hitch at the rear of a vehicle.

BACKGROUND OF THE INVENTION

Many of today's vehicles, including most SUV's, 4×4s, vans, RVs and large trucks have step bumpers used for accessing the roof racks or beds of the vehicle. These step bumpers are usually a significant distance from the ground, sometimes in excess of 36". Considerable effort, even by a young and healthy person, is required to step up onto or off of such a bumper step. Some vehicles do not even have a step bumper, making access to the upper portions of the vehicle even more difficult. Several attempts to resolve this problem have been made. A simple step is attached to the bumper or to the hitch assembly of the vehicle to improve ease of access to the vehicles upper surface, but most must typically be removed when not in use, or provide little or no functionality if they are left in place during driving of the vehicle. There are also various proposals to add additional lighting attached to the rear of the vehicle. It has been proven by various government highway safety studies, that the addition of the so-called "third brake light" onto the rear of vehicles, cuts the risk of rear end accidents substantially.

Although there have been many attempts to provide steps of various types for the front, rear or side of some vehicles these attempts have not been successful in providing an easily removable folding step that may be attached to an existing trailer hitch at the rear of a vehicle. Therefore, there still exists a need for an easy to manufacture, easy to mount and easy to use step for the rear of a vehicle that may be safely inserted and removed for use on different vehicles, and particularly, in an existing trailer hitch What is needed is a step assembly that can be conveniently and securely folded up and out of the way during normal driving, while advantageously providing some driving safety improvement through the use of a auxiliary brake light, and in preparation for towing operation can be quickly and easily removed from the trailer hitch receiver.

DISCLOSURE OF THE INVENTION

Accordingly, it is an object of the invention to meet any or all of the needs summarized above.

These and such other objects of the invention as will become evident from the disclosure below are met by the invention disclosed herein.

A new, useful, and unique design for combining a flip-down step with a running/brake light, that is mounted on a truck step bumper or in a trailer hitch receiver is disclosed. This new design improves driving safety and functionality, as well as providing efficient and safe access to the upper portions of their vehicles.

In particular, a foldable step assembly that is engageable with a trailer hitch receiver is disclosed. The step assembly has a step plate pivotally mounted to a step mount shank, wherein the step plate is foldable from a horizontal use position to a vertical storage position, and a plurality of pin holes in the step mount shank, whereby the step assembly may be adjustably positioned with respect to the trailer hitch receiver to achieve a variable horizontal clearance between the step plate and a rearward end of the receiver.

A foldable step assembly that is engageable with a trailer hitch receiver is disclosed. The step assembly has a step plate pivotally mounted to a step mount shank, wherein the step plate is foldable from a horizontal use position to a vertical storage position, and a brake light. The brake light is mounted on the step plate such that the brake light is visible when the step plate is in the vertical storage position.

The step mount shank is typically adjustably engaged with a trailer hitch receiver, and the trailer hitch receiver is mounted to a rearward part of a vehicle. Alternatively, the step mount shank is adjustably engaged with a trailer hitch receiver adapter, and the trailer hitch receiver adapter mounted to a trailer hitch ball on a rearward part of a vehicle.

A foldable step assembly that is engageable with a trailer hitch receiver is disclosed. The step assembly has a step plate pivotally mounted to a step mount shank, wherein the step plate is foldable from a horizontal use position to a vertical storage position, and the step plate has a latch receiving recess, and a latch mechanism mounted on an upper part of the step mount shank, the latch mechanism further comprising a latch tab releasably interengageable with the latch receiving recess to securely lock the step plate in the vertical storage position. A brake light is also advantageously included, and the brake light is mounted on the step plate such that the brake light is visible when the step plate is in the vertical storage position. There may advantageously also be a plurality of pin holes in the step mount shank, whereby the step assembly may be adjustably positioned with respect to the trailer hitch receiver to achieve a variable horizontal clearance between the step plate and a rearward end of the receiver. The latch mechanism can either be a pivotally mounted latch that is spring biased to a latched position, or an L shaped member with at least one spring tang and a latch tang, whereby the spring tang applies a bias pressure to the step plate in the vertical stored position to press it against the latch tang for a securely locked engagement.

Advantageously, a wiring channel is provided in the step plate and a wiring harness is attached between the brake light and a plug, with the harness running in the wiring channel.

If the vehicle has an existing class II or class III trailer hitch, with a 2" receiver opening, or a truck style step bumper, the addition and use of novel design disclosed gives the user an intermediate height step for safer and easier access to the top of their vehicle. The combination of the "third brake light" to the outer visible surface of the step also increases the vehicle's visibility when the running lights are on and especially while braking. The optional "super bright" LED array is visible for a considerable distance and is advantageously connected to existing trailer wiring through a modular plug similar to that which is common to most electrical trailer wiring connections. In addition the disclosed step assembly provides an additional smooth surface for customizing stickers and is an attractive trailer hitch receiver hole cover when the step is folded up.

The novel designs disclosed provides an accessory for attachment to existing trailer hitch receiver or truck style step bumper, to add the functionality of a fold down step and 3rd/4th, brake light. It is designed to fit most class II and class III trailer hitches with a 2" square receiver opening or truck style step bumper using a receiver adapter to fasten it to the bumper. It s designed with the HUV, van or Large truck in mind, such as Chevrolet Suburban, Dodge Durango, Jeep Cherokee, Toyota 4-Runner, Nissan Pathfinder, or any large 4×4, van, truck, RV or the like, and the step assembly can be painted to match vehicle's color, black, or polished to a high gloss simulating chrome plating.

BEST MODE OF CARRYING OUT THE INVENTION

Figure 1:
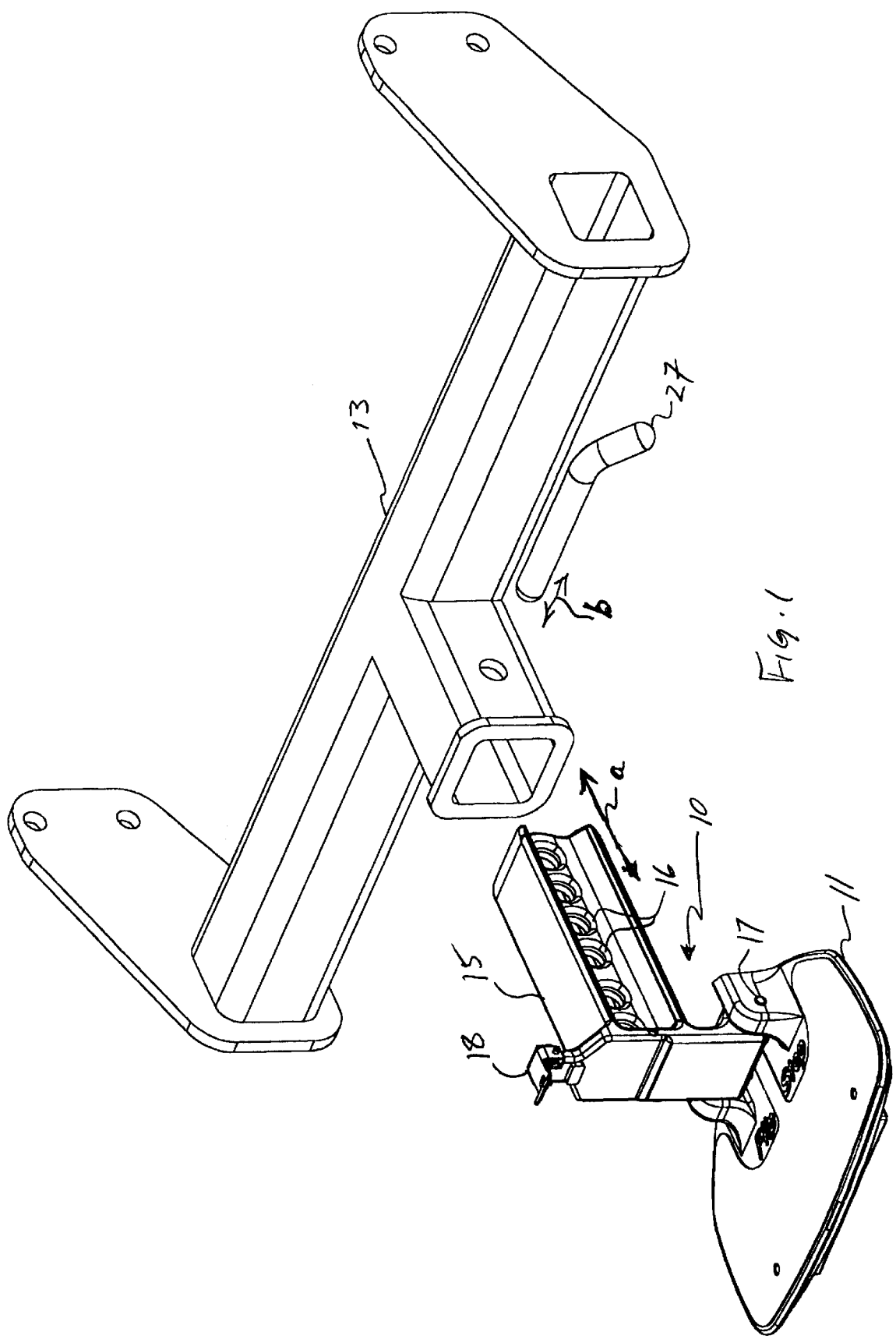
FIG. 1 is perspective view of one embodiment in use.

Turning now to the drawings, the invention will be described in a preferred embodiment by reference to the numerals of the drawing figures wherein like numbers indicate like parts.

In FIG. 1 conventional 2" trailer hitch receiver 13 and frame are mounted to a vehicle (not shown) and ready to receive step assembly 10. Step assembly 10 is slidably engaged in the opening of trailer receiver 13 in the direction generally shown by arrow "a" in the figure. When assembly 10 is fully engaged within receiver 13 and adjusted by lining up the appropriate pin hole 16 in step assembly 10 with the pin hole in receiver 13, step assembly 10 is secured within receiver 13 by sliding receiver pin 27 into and through step shank 15 via the selected pin hole 16. Removal of step assembly 10 is effected by pulling pin 27 generally along the direction indicated by arrow "b" and reversing the above process. Multiple pin holes 16 allow for forward—backward adjustment of the position of step plate 11. This allows the step to be mounted as close to the vehicles bumper or under carriage as reasonable without interfering with it's operation and keeping the step close in to the vehicle when in the up position.

Figure 2:
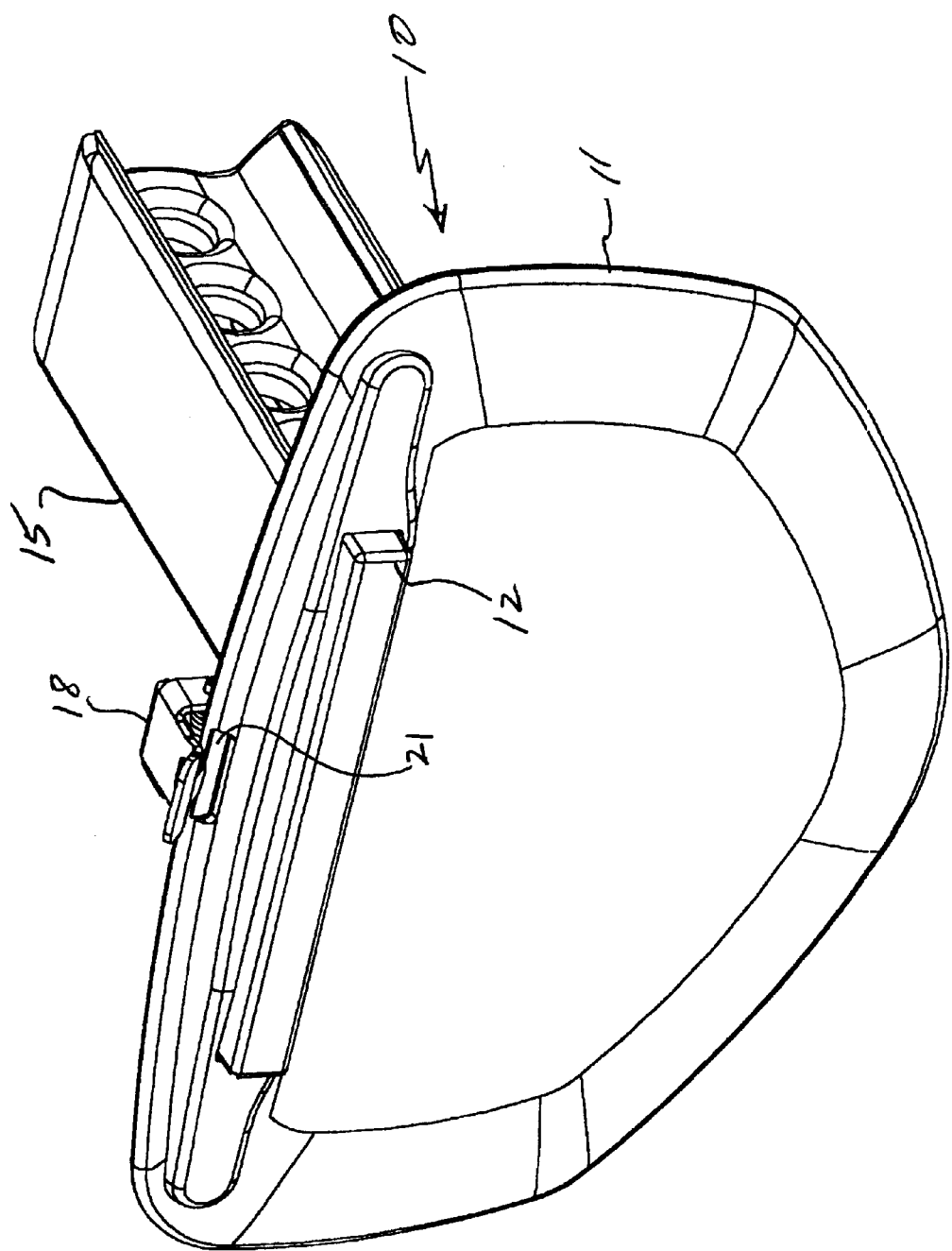
FIG. 2 is perspective view of the step assembly with the step folded up.

Step assembly 10 has a step shank portion 15 and a step plate 11 pivotally joined by pivot pin 17 so that step plate 11 may rest open in the position generally shown in the figure, or may be swung or folded up and closed (see FIG. 2). Pivot latch mechanism 18 stands ready to receive step plate 11 in a vertical or closed storage position.

In FIG. 2 step assembly 10 has step plate 11 folded up into a securely locked closed or vertical storage position to present brake light 12 facing rearwardly of the vehicle. Tang or tab 20 (see FIG. 3) is engaged within recess 21 in step plate 11 and held there securely by the bias of spring 19 (see FIG. 3).

Figure 3:
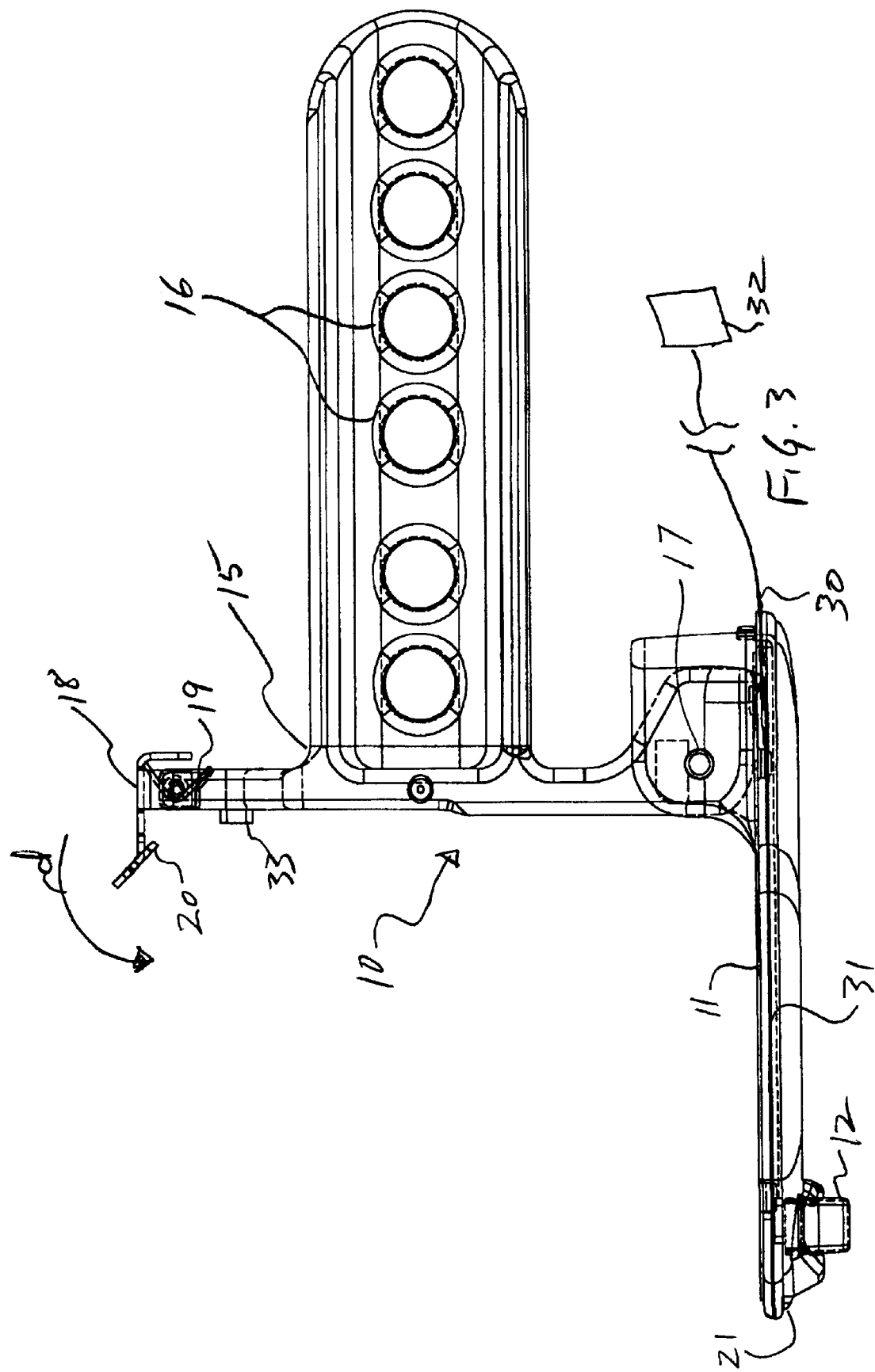
FIG. 3 is a side view of the step assembly with the step folded down.
Figure 5:
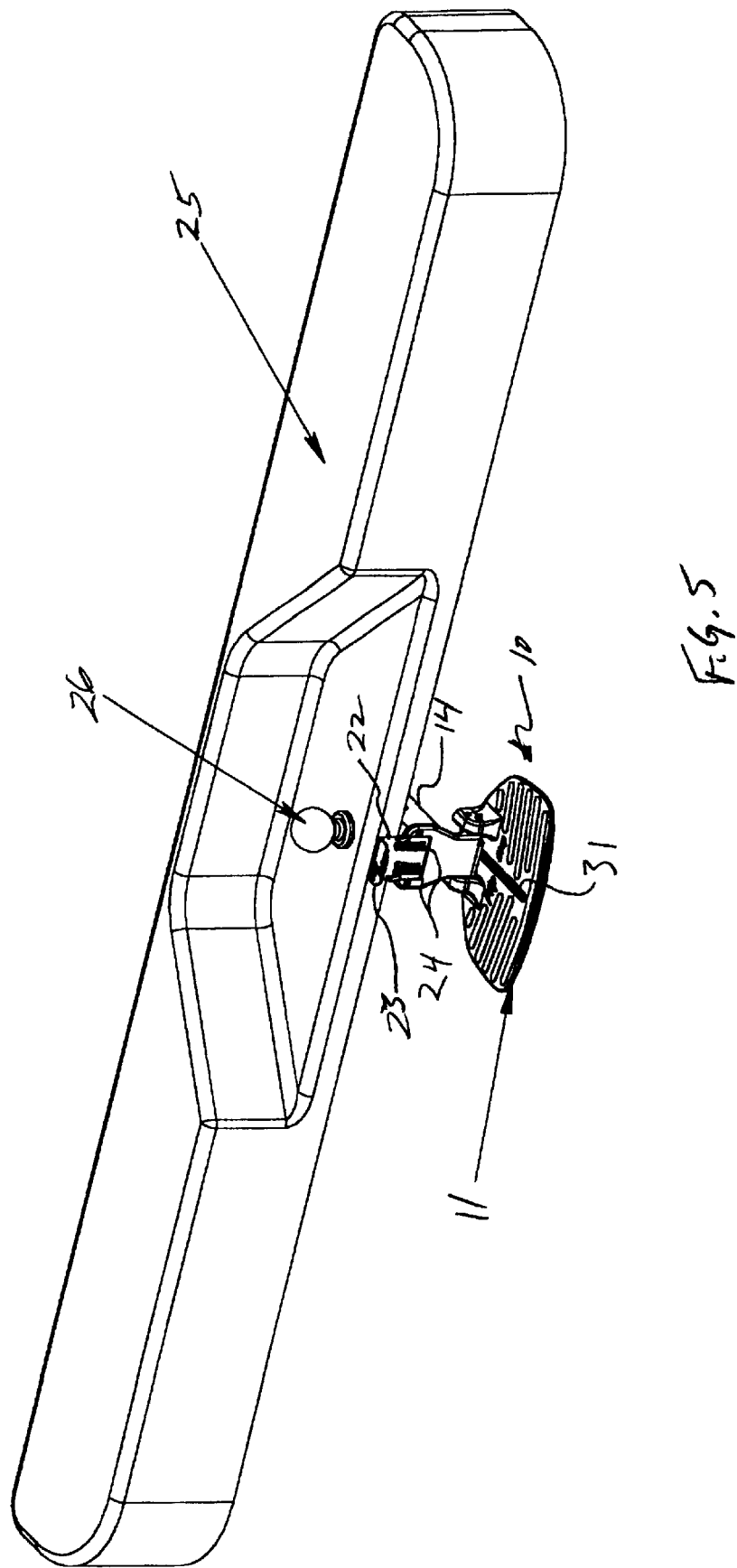
FIG. 5 is a perspective view of an alternate embodiment.

In FIG. 3 step plate 11 is down for use when engaged in trailer hitch receiver (see FIGS. 1 and 5). Pivot type latch mechanism 18 has a latch tab or tang 20 for engaging recess 21 (see FIG. 2) in step plate 11. Spring 19 biases tab 20 generally in the direction shown by arrow "d" in the Figure. Resilient pad 33 optionally provides a cushioning for the closure of step plate 11 to mitigate wear and damage to the plate facing portion of step shank 15; pad 33 also provides compressive resistance bias to plate 11 when plate 11 is in its closed position so that the portion of recess 21 gripped by tab 20 actually applies a back bias to the tab to aid in securely fixing tab 20 in place to securely lock plate 11 up.

Step plate 11 advantageously has a groove or channel 31 in the stepping surface to receive wiring harness 30 that runs from brake light 12 to modular plug 32. Channel 31 is covered with some non-slip material and hidden from ordinary view, while channel 31 provides both a secure path for harness 30 and an aesthetically pleasing routing of brake light 12 wiring, whether step plate 11 is locked up or folded down.

Figure 4:
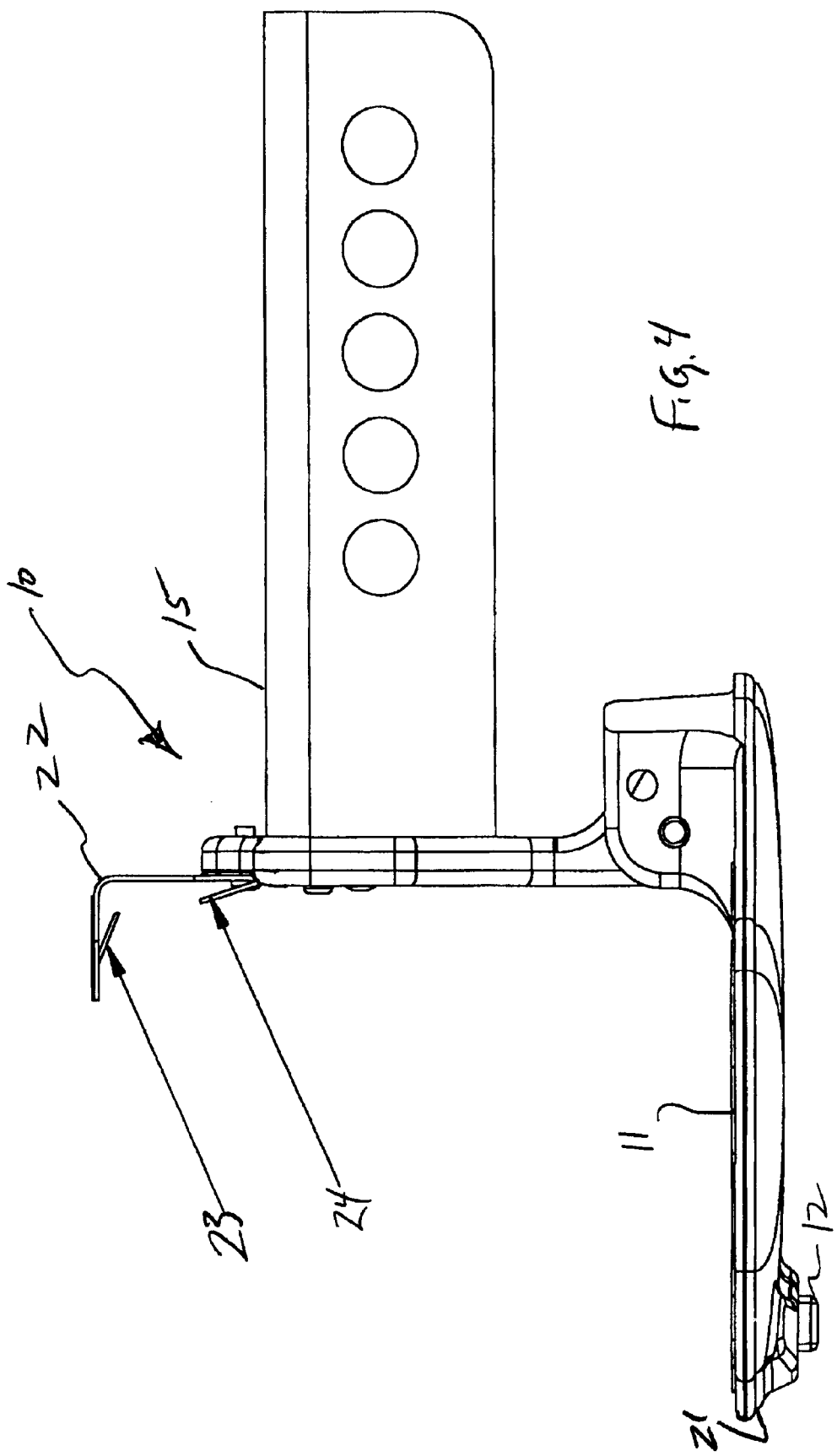
FIG. 4 is a side view of an alternate embodiment.

In FIG. 4 an alternate embodiment of the latch mechanism is shown. Tang latch 22 is mounted upon an upper portion of the plate facing portion of step shank 15 so that tang 23 is available to grip recess 21, in a manner similar to that of tab 20 described above for FIG. 3. Preferably a pair of spring bias tangs 24 provide a back bias for plate 11 in its up or closed or locked position, and enhance the locked interengagement of tang 23 with recess 21 by pressing recess 21 resistively or frictionally against tang 23 so that tang 23 securely holds plate 11 up and locked even on rough road driving conditions.

In FIG. 5 a conventional step bumper 25 and trailer ball 26 combination are shown as an alternate mounting for step assembly 10. Conventional receiver adapter 10 is mounted beneath bumper 25 using the bolt (not shown) from ball 26 in a well known manner. Thereafter, step assembly 10 engages receiver adapter 14 in much the same manner as it engages receiver 13 in FIG. 1. Alternate latch 22 is also shown in this figure, as are spring tang pair 24. Preferred location of channel 31 in plate 11 is also illustrated.

The step assembly can optimally be attached to the vehicle in two ways. It can be inserted into the 2" trailer hitch receiver opening and attached to the hitch using a common ⅝" receiver accessory retaining pin. There are optimally several mounting pin holes on the step shank of the step assembly used for adjusting the step's location, in relation to the vehicle and it's most efficient positioning. Many existing step designs are not adjustable and do not work efficiently on many vehicles, or not at all on some. It can alternatively be attached to a step bumper by using a conventional 2" receiver adapter and then inserting the step as described above. The preferred step surface is approximately 9¼"×5" giving the user a significant surface area for safe stepping or standing.

Step plate 11 is mounted to the hitch mounting member or step shank 15 by pivot pin 17 and is preferably held shut by stainless steel spring load latch 18 at the top of the step. The latch pivots on a stainless steel roll pin and is designed with a tab 20 that catches the top of the step at recess 21 to retain it. A small wound torsion spring is located under the latch that supplies downward force on the latch to help the tab to engage the step when closing. Lifting up on the latch mechanism releases the step from it's secured position, allowing the step to flip down to a position 90 degrees and perpendicular to the receiver assembly and the vehicle. It is designed with a solid stop, which maintains the step's position relatively parallel to the ground. It remains in the down position held only by it's own weight and for added safety is not latched down. If it is accidentally hit by the user, it is free to move, reducing the impact to the user's leg area. When not needed step plate 11 can be lifted up with little effort to its vertical position, where the spring loaded latch holds it securely. The spring tension of the latch will keep the step from any accidental release even on rough roads or incidental contact, thus keeping the step in a safe and secure mode during all driving conditions.

Two alternate methods of latching the step are also provided. In one step plate 11 is engaged with step shank 15 by a pivot pin which is in turn attached to a locking or latching pin. These pins are spring loaded and actuate simultaneously when pulled outward using an attached pull ring or finger pull. The locking pin is then released from it's secured position, allowing the step to be released to fold down. Preferably the release pin is located next and interengaged with the pivot pin, which locks the step in the upward most position. When pulled, the step folds down perpendicular to the hitch and parallel to the ground. This is accomplished by pulling outward on a finger pull ring attached to the two pins. The pivot pin and release pin, are attached to each other, or are made from one single bent pin, and move simultaneously. A return spring on the pivot pin shaft pulls the pins back into a latched position when the step is flipped up. This makes accidental release and lowering of the step very difficult to do by accident while allowing for easy and positive positioning by the user. When the step is lifted up it latches automatically and securely with the latching pin in a vertical position.

A method alternate to the above is to secure the step in the up position by using a pivot pin with a defined shape that keys or locates to a corresponding shape in both the step plate and step shank pivot plate, thus locking the two together when mated.

When not needed it can be lifted up with little effort to it's vertical position, where it is automatically fixed by the spring loaded latching pin which is pulled back into a detent on the pivot plate that securely holds the step until released again.

In an alternate latch, an L shaped sheet metal flange made of spring steel approximately 2" wide is pop-riveted on its long leg to the front upper face of the step shank's facing or pivot plate. The long section also has two or more formed tangs bent towards step plate 11 which act as tension springs during the latching procedure. The short section of the flange, which is used as the step release tang, is at 90 degrees to the long section and hangs over the lip of the step when step plate 11 is in the closed position. Under this upper short flange, is a formed tang 23 that extends downward at approximately a 30 degree angle that acts as a catch engaging in a notch or recess 21 in the step during the latching process. When closing the step the tang rides over the front lip of the step and springs down into the notch locking it in place. Lifting up on the release flange pulls the tang out of its locked position in the notch on the step and the step can be lowered.

Tang 23 is very difficult to disengage by accident or while the vehicle is in use because it takes considerable effort to lift the release flange to disengage the step, because it is under spring pressure from the latching tang, as well as the formed spring tangs on the long section. The use of this design eliminates several of the components in the just above mentioned latch pin design, and reduces the cost and part count of the assembly considerably. It also allows the user easier access to the step release mechanism with out having to search behind the step assembly for the latch pin release ring.

Step assembly 10 parts are preferably made of high strength 535 sand cast aluminum for superior surface quality finish and lasting durability. It is very light-weight and highly corrosion resistant. It may also be made of high strength injection molded plastic or other metal.

Preferred step surface measure approximately 9-1/8"×5" (approx. 46 square in.) and facilitates safe standing or stepping. The step side preferably has an anti-slip tread material that is adhered to the step surface for user safety, and is easily cleaned. The anti-slip material can also be die cut with custom designs or logos for licensed distributors. It can even have reflective stripes on it for better visibility at night. Step assembly 10 can be left in receiver 13 until the hitch is needed for connecting to a trailer, and then can be removed and stored easily.

When in the upward-most position, step plate 11 it is an attractive trailer hitch hole cover with a highly visible "super bright" LED light array and red reflector lens brake light assembly 12, which is wired to the vehicle's existing trailer wiring. The light is wired using three wires and a 4-position harness connector, common to most trailer hitch wiring circuits. The light comes on in a lower intensity state when the vehicles running lights are on, and when the brakes are applied, increases to it's highest intensity state, adding another level of brake and safety lighting for the vehicle. The wiring for the LED array is routed in groove 31 on the step side of step plate 11, hidden by a Mylar label or some non-slip step surface material.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A foldable step assembly engageable with a trailer hitch receiver, the step assembly comprising:

a) a step plate pivotally mounted to a step mount shank, wherein the step plate is foldable from a horizontal use position to a vertical storage position, and the step plate has a latch receiving recess, and b) a latch mechanism mounted on an upper part of the step mount shank, the latch mechanism further comprising a latch tab releasable interengageable with the latch receiving recess to securely lock the step plate in the vertical storage position, the foldable step assembly further comprising a brake light, the brake light mounted on the step plate such that the brake light is visible when the step plate is in the vertical storage position, and further comprising a wiring channel in the step plate and a wiring harness attached between the brake light and a plug, the harness running in the wire channel.

2. A foldable step assembly engageable with a trailer hitch receiver, the step assembly comprising:

a) a step plate pivotally mounted to a step mount shank, wherein the step plate is foldable from a horizontal use position to a vertical storage position, and the step plate has a latch receiving recess, and b) a latch mechanism mounted on an upper part of the step mount shank, the latch mechanism further comprising a latch tab releasably interengageable with the latch receiving recess to securely lock the step plate in the vertical storage position, wherein the latch mechanism is an L shaped member with at least one spring tank and a latch tang, whereby the spring tang applies a bias pressure to the step plate in the vertical stored position to press it against the latch tang for a securely locked engagement.

* * * * *